(12) United States Patent
De-Noor et al.

(10) Patent No.: US 6,571,893 B2
(45) Date of Patent: Jun. 3, 2003

(54) LIGHT VEHICLE FOR SPORTING AND OFF-ROAD BIKING

(75) Inventors: Yoram De-Noor, Misgav (IL); Yoram Uziel, Misgav (IL)

(73) Assignee: Yozmot Gfanot Initiative Center (IL)

( * ) Notice: Subject to any disclaimer, the term of this patent is extended or adjusted under 35 U.S.C. 154(b) by 0 days.

(21) Appl. No.: 09/971,602

(22) Filed: Oct. 9, 2001

(65) Prior Publication Data

US 2002/0062999 A1 May 30, 2002

Related U.S. Application Data

(63) Continuation of application No. PCT/IL00/00002, filed on Jan. 3, 2000.

(51) Int. Cl.[7] .............................................. B62D 55/00
(52) U.S. Cl. ..................... 180/9.23; 180/9.4; 180/14.2; 280/492
(58) Field of Search ................................ 180/9.22, 9.23, 180/9.25, 9.4, 14.1, 14.2; 280/492–494

(56) References Cited

U.S. PATENT DOCUMENTS

| | | | | |
|---|---|---|---|---|
| RE26,775 E | * | 1/1970 | Smieja | 180/9.23 |
| 3,650,343 A | * | 3/1972 | Lesell | 180/9.4 |
| 4,072,203 A | | 2/1978 | Pierson | |
| 4,727,949 A | | 3/1988 | Rea et al. | |
| 4,909,341 A | * | 3/1990 | Rippingale et al. | 180/9.4 |
| 5,984,032 A | | 11/1999 | Gremillion et al. | |
| 6,220,377 B1 | * | 4/2001 | Lansberry | 180/9.36 |

* cited by examiner

Primary Examiner—Lesley D. Morris
Assistant Examiner—Matthew Luby
(74) Attorney, Agent, or Firm—Banner & Witcoff, Ltd.

(57) ABSTRACT

A vehicle for sporting and off-road driving includes a front and a rear component assembly and a joint arrangement. Each component assembly includes a plate mounted on a single flexible track and that is actuated by the single flexible track. The joint arrangement connects the plate of the front assembly to the plate of the rear assembly, and has two degrees of freedom that permits the front and rear component assemblies to be displaced with respect to each other around a horizontal, transverse axis and around a vertical axis.

21 Claims, 11 Drawing Sheets

LIGHT VEHICLE FOR SPORTING AND OFF-ROAD BIKING

This is a continuation of application no. PCT/IL00/00002 filed on Jan. 3, 2000.

FIELD OF THE INVENTION

The invention relates to a lightweight vehicle or sporting and off-road driving, which can be driven on extremely difficult terrain, is capable of crossing obstacles and barriers, is not dangerous and is sufficiently small and light, can be carried by the driver or housed in the luggage compartment of a car.

BACKGROUND OF THE INVENTION

Various types of vehicles for sporting and off-road driving are known in the art. They may be two-wheeled, such as motorcycles, or may be small four-wheeled vehicles. However, all of them, particularly when used for sporting, are dangerous and are the cause of many accidents, due to their high speed and inadequate stability.

Further, then ability to drive over difficult terrain, including obstacles and barriers, is limited. Four-wheeled vehicles find it very hard to overcome obstacles while motorcycles can overcome them in some cases, but require from the driver considerable ability and an often dangerous and sometimes even acrobatic performance.

Furthermore, the existing vehicles are fairly heavy and cumbersome and cannot be lifted by the driver and hand carried over obstacles that cannot be overcome, such as walls, canals, and the like, and cannot be housed in a confined space, for instance, in the luggage compartment of an ordinary car, so that the driver cannot transport them to distant terrain by driving a car in an ordinary way over highways or roads.

It is a purpose of this invention to provide a novel vehicle which has a number of features and advantages that are lacking in the vehicles of the prior art. These include:

1—The vehicle has the ability to be driven on almost any difficult terrain due to its drive method based on dual articulated tracks system;

2—It is an attractive and entertaining device, adapted to off-road sport driving;

3—It is safe and cannot cause accidents due to high-speed driving on difficult terrain;

4—It is lightweight, and can easily be hand carried by the user, when this becomes necessary for any reason;

5—It is sufficiently small, and can be folded or disassembled into two component assemblies, so as to be carried in the baggage compartment of au ordinary car;

6—It can be constructed by using technology known in the art;

7—It is inexpensive to make and operate.

8—It has a smart drive and motor system.

9—It has an optional dual—fuel and electric—motors system, wherein the fuel motor charges a battery and the vehicle can use its electric motor for quiet operation, or its fuel motor for high performance, long range operation.

9—Due to its motor and drive system, the vehicle is environmentally friendly: low noise operation, low ground pressure and narrow profile, contribute to a minimized interference with the ground and the environment.

SUMMARY OF THE INVENTION

The vehicle according to the invention is composed of two component assemblies, a front and a rear component assembly, each which comprises a plate, which constitutes its frame member, supported on a single flexible track, longitudinally and centrally located with respect to the respective component assembly, said front and rear plates being connected by a joint which has two degrees of freedom to permit the two component assemblies of the vehicle to be displaced with respect to one another, by rotating about a vertical axis, to enable the driver to control the vehicle's direction, and about a horizontal transverse axis, to permit the vehicle to overcome slopes and/or obstacles. Preferably, the rotation about the horizontal axis is limited, more preferably to a few degrees above and below the horizontal plane, and the relative displacement of the said two component assemblies about said axis is subjected to non-linear resistance provided by two coil springs.

In this specification and claims, the terms "vertical" and "horizontal" refer to the position of the vehicle-when placed on a flat horizontal surface. Each component assembly is essentially (though not necessarily absolutely), statically symmetric with respect to a plane parallel to the direction in which the component assembly can move and therefore coinciding with the axial plane of the respective track. Said plane is called herein "the longitudinal axial plane" of the component assembly. It will be understood that, because of the presence of the aforementioned joint, the longitudinal planes of the two assemblies can rotate with respect to one another to permit the vehicle to be steered. Any axis perpendicular to the longitudinal axial plane of a component assembly is "transverse" with respect to said assembly.

A minor static asymmetry may occur in each component assembly, since the motor, transmission and suspension parts thereof are located part on one side and part on the other of said longitudinal axial plane, as will be better seen hereinafter, and therefore, while ideally the center of gravity of said assembly should be located on said plane, in practice it may be slightly displaced from it, although skied persons can design each vehicle in such a way as to minimize said displacement. In any case, said displacement is irrelevant in the front component assembly, and, as to the rear component assembly, the vehicle user or rider can compensate it by locating himself slightly to one side of said plane, so that his center of gravity is displaced from said plane to the side thereof opposite to the side to which the center of gravity of the assembly is displaced.

The vehicle is provided with motor means, which preferably comprise a motor for each of the two component assemblies. Said motors may be independent or actuated by a common source of power. Various embodiments of motor means may be alternatively preferred, depending on the particular operation for which each individual vehicle is intended E.g. the source of power may be a combustion engine, the fuel being gasoline or diesel oil. The engine may drive a hydraulic pump, e.g. a variable displacement pump, which supplies hydraulic fluid under pressure to two hydraulic motors, one for each component assembly.

In another embodiment, the combustion engine may drive a generator, which supplies electrical current to two electric motors, one for each component assembly.

In a further embodiment, each component assembly is provided with a battery which supplies electric current to a motor. Said batteries may be charged from an external source of electric power. The choice of the embodiment is made according to the performance that is desired by the vehicle in each case, as will be better explained later.

In another embodiment of the invention, the vehicle is provided with a dual—fuel and electric—motors system, wherein the fuel motor charges a battery and the vehicle can use its electric motor for quite operation, or its fuel motor for high performance, long range operation.

The rider stands on the rear plate. Further, the front plate is provided with steering means, which preferably comprises two handles, one for each hand of the driver, and with a steering column connecting said plate to said handles. Preferably, said column in connected to said plate by two joints, having a horizontal and a vertical axis respectively, or by a joint having two degrees of liberty, a horizontal and a vertical one.

The tracks mesh with and are driven by wheels, which are part of the transmissions. For the purposes of this description, the part of each track that is below said wheels, will be called the "operative section" of the track, the part that is above said wheels will be called its "inoperative section" and the arc-shaped parts which connect said two sections will be called its "connecting sections". It will be understood that all the parts of each track alternatively become part and alternatively cease to be part of each of said sections.

Now, preferably, the operative portion of the rear track is straight and horizontal and that of the front track comprises two straight segments, a horizontal rear segment and a front segment at an angle to the rear segment and slanted away from the ground when the vehicle is placed on flat horizontal ground. For brevity's sake, the rear and front segment will sometimes be called hereinafter the "horizontal" and the "raised" segment, respectively. The shape of the inoperative sections is not critical, though it is generally preferred that they be straight and horizontal to save space while simplifying structure.

The two plates are preferably provided with bottom or depending ribs, to which the wheels that dive the tracks are attached, directly or by means of connecting levers, as the case may be. Elastic means are provided at least between the rear plates and its connecting levers, to provide an elastic suspension.

Since only one track is provided for each plate and is positioned in its longitudinal axial plane, the vehicle has a balance comparable to that of two-wheeled vehicles, such as motorcycles, and the driver will balance the vehicle in a way similar to that in, which he would balance any two-wheeled vehicle. However, such balancing is easier than for motorcycles or bicycles, because the entire body of the driver contributes to it, and not only in the upper part of the body, as in said two-wheeled vehicles.

Since the two plates of the vehicle are connected by a joint which permits rotation about a horizontal axis, the vehicle of the invention can be folded in order to store the vehicle in a limited space and transport it, e.g., by means of a car. If folding is not enough, the joint between its two plates permits to separate them, so as to disassemble the vehicle into a front and a rear component assembly.

BRIEF DESCRIPTION OF THE DRAWINGS

In the drawings:

FIG. 1b is schematic, partial cross-section of FIG. 1a, taken on plane A—A of FIG. 1a;

DETAILED DESCRIPTION OF PREFERRED EMBODIMENTS

Figure 1:
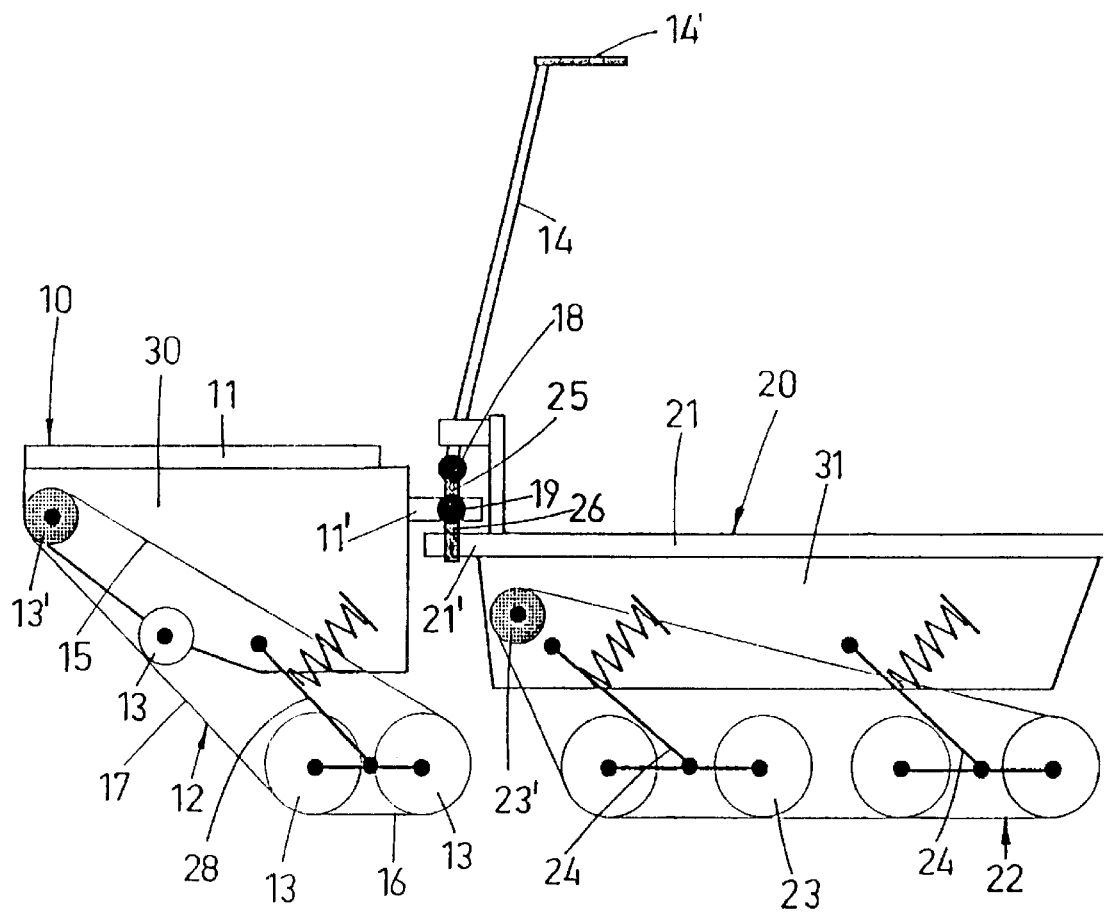
FIG. 1 is a schematic side illustration of the structure of a vehicle illustrating an embodiment of the invention.

FIG. 1 schematically illustrates an embodiment of the invention. In FIG. 1, the vehicle comprises two parts, the front component assembly 10 and the rear component assembly 20. Front component assembly 10 comprises a front plate 11, which rests on a single, centrally located track 12 supported by supporting wheels 13 and actuated by drive wheel 13, and having: a) a straight inoperative (upper) section 15, b) an operative (lower) section which is comprised of a rear (horizontal) segment 16 and a front (raised) segment 17, at an angle to one another, and c) two arc-shaped connecting sections about wheels 13 and 13'. Plate 11 has a depending lower rib 30 on which the drive wheel and the uppermost supporting wheel are mounted directly and the remaining supporting wheels are mounted through a spring-biased lever 28. Rib 30 preferably has a, shape corresponding to the profile of the operative section of track 17, viz. it has a horizontal rear portion and a raised front potion ("horizontal" and "raised" referring, once again, to the position of the vehicle when resting on a horizontal, flat surface).

Rear component assembly 20 comprises a rear plate 21, which has a depending, lower rib 31, which is connected to a single, centrally located track 22 which supports said plate and is supported by supporting wheels 23 and actuated by drive wheel 23'. The operative section of said track is horizontal wheels 23 are connected to rib 31 by levers 24, while wheel 23' is mounted directly on rib 31.

Figure 1A:
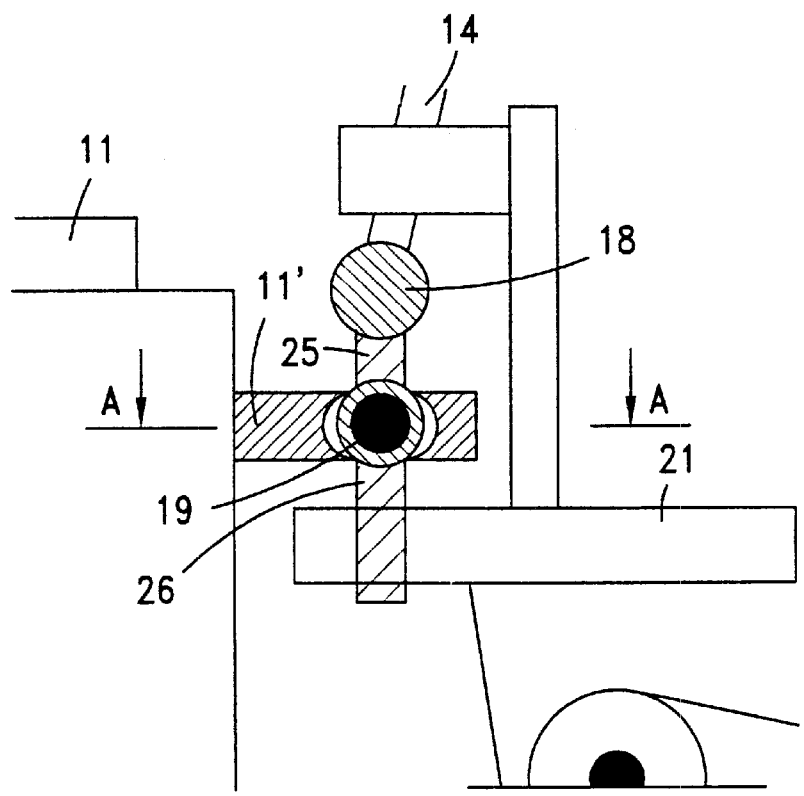
FIG. 1a is a schematic detail of FIG. 1 at an enlarged scale, showing an embodiment of the joint means between the front and rear component assemblies of the vehicle.
Figure 1B:
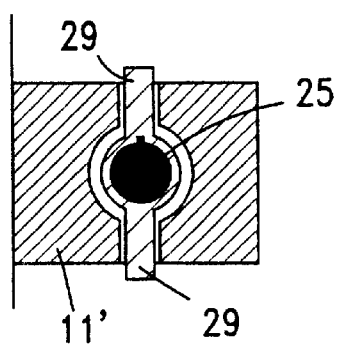

A vertical column 14 is provided for steering the vehicle, and carries steering handles 14', and levers 27, 27' (not shown in FIG. 1) for actuating brakes similar to those of motorcycles, which levers are not illustrated in detail, as they are conventional. Column 14 is operatively connected to front plate 11 through two joint couplings 18 and 19. Joint 18 is a conventional pivot joint with a horizontal axis, and only permits to slant column 14 with respect to a connecting member 25, and therefore with, respect to the remaining components of the vehicle, towards or away from the rider. As illustrated in schematic detail in FIGS. 1a and 1b (the latter figure being a partial cross-section of the first on plane A—A, and showing only joint 19), connecting member 25 is connected to a second connecting member 26 by a lower joint 19. Front plate 11 is rigid with a projection 11', in which the joint 19 is housed and which is coupled thereto in such a way that no rotation about a vertical axis is permitted between said projection 11' and said connecting member 25. E.g., as seen in the section of FIG. 1b, said connecting member 25 has two wings 29 which engage two slits in projection 11', so that when the column 14 is rotated to steer the vehicle, and connecting member 25 rotates with it, projection 11' and plate 11 rotate with said connecting member to steer the front assembly 10. However, as seen if FIG. 1a, joint 19 permits free rotation of projection 11' with respect to connecting member 25, so that front assembly 10 can rotate about a horizontal axis about said connecting member—although to a limited extent, as will be explained. Second connecting member 26 is rigidly connected to a projection 21' of rear plate 21. Therefore, when connecting member 25 rotates with respect to second connecting member 26, front component assembly 10 correspondingly rotates with respect to rear component assembly 20. These rotations being about horizontal axes, they permit the two component assemblies to become slanted with respect to one another, whereby the vehicle adapts itself to slopes or irregularities of the terrain over which it moves.

It will be understood that the structural means herein described have the function of permitting free relative rotation of plates 10 and 20 about a vertical axis, and (limited) rotation thereof about a horizontal axis. Therefore they constitute, together, a joint having two degrees of freedom. Persons skilled in the art will be able to device other joints having two degrees of freedom, and therefore the structure illustrated herein is only a non-limitative example.

Figure 2:
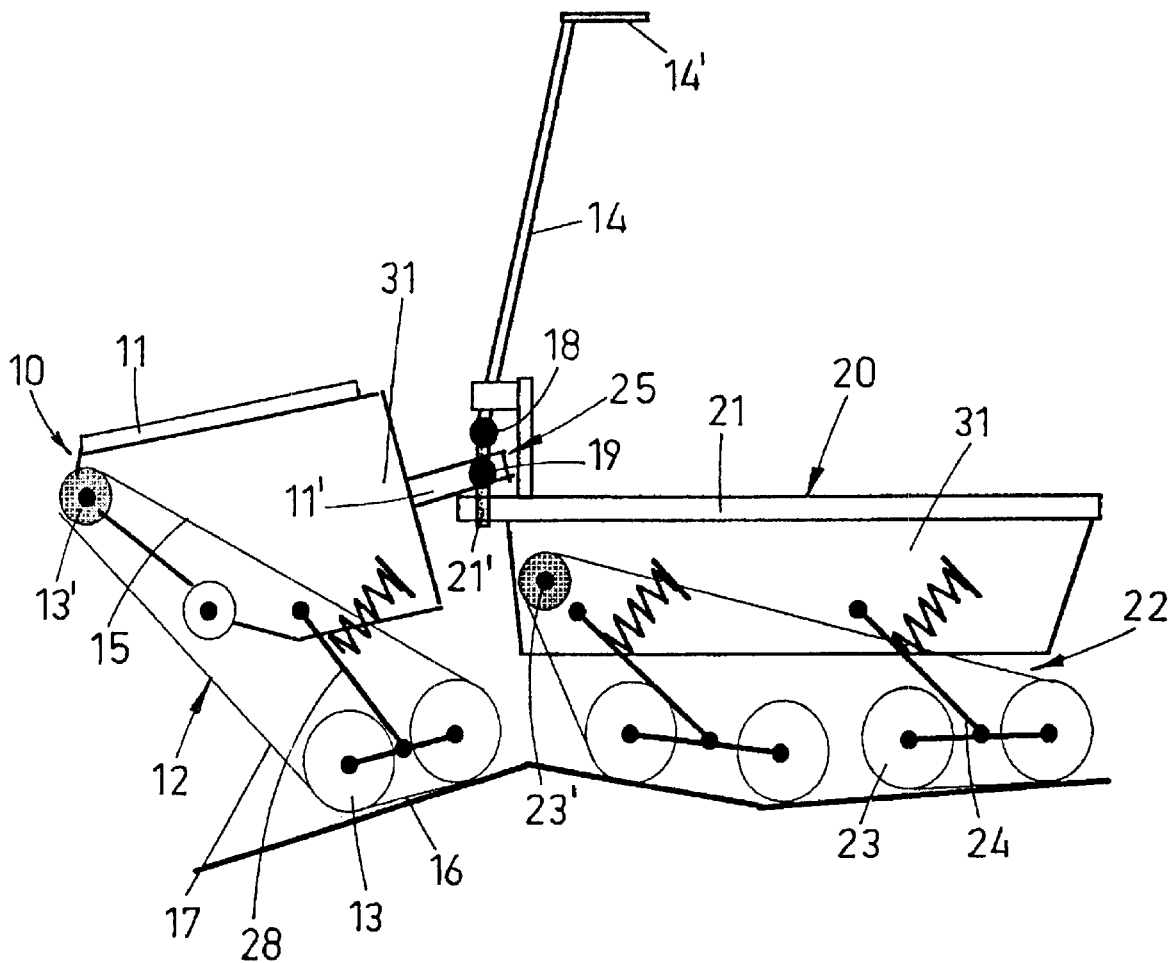
FIG. 2 schematically shows the vehicle of FIG. 1 riding over irregular terrain.

FIG. 2 schematically illustrates the fiction of the connection between front and rear component assemblies, and particularly its degree of freedom about a horizontal axis, in overcoming terrain irregularities. The parts of the vehicle are indicated by the same numerals used in FIG. 1. As seen in FIG. 2, when the vehicle rides on sloped or difficult ground, joint 19 permits projections 11' and 21', and therefore plates 11 and 21, freely to rotate relative to one another, viz. to become slanted, with respect to one another, about a horizontal axis. Preferably, such a relative rotation, used to ease crossing of obstacles, while free, is limited in extent, preferably to a few degrees, e.g. to ±5 degrees, by limiting or stop means not shown or described, as they can be easily provided by any skilled person. Further, said relative rotation or slant is dampened by dampers, such as standard shock absorbers based on hydraulic liquid, or elastic means, such as springs, also not shown as they may be conventional and easily provided by skilled persons.

It will be understood that the steering and joint means descried are merely an example, as many kinematically equivalent means can easily be devised by skilled persons, without departing from the invention. It is only required, in this embodiment of the invention, to provide steering means that can be actuated by the vehicle rider to steer the front component assembly, and therefore the vehicle, to the desired direction, and to provide joint means that permit free (though preferably limited and dampened) angular displacement or swinging of the two component assemblies about a horizontal axis, viz. in a vertical plane. When the vehicle moves on a flat area, there will be no displacement about the said horizontal axis.

Preferably, the rear plate is substantially longer, e.g. twice as long, as the front plate. As a particular example, the length of the rear plate might be in the order of 80 cm and that of the front plate in the order of 40 cm. However, it will be understood that these dimensional examples are in no way essential or limitative and that skilled persons will easily determine the dimensions appropriate to carry any embodiment of the invention.

Figure 3:
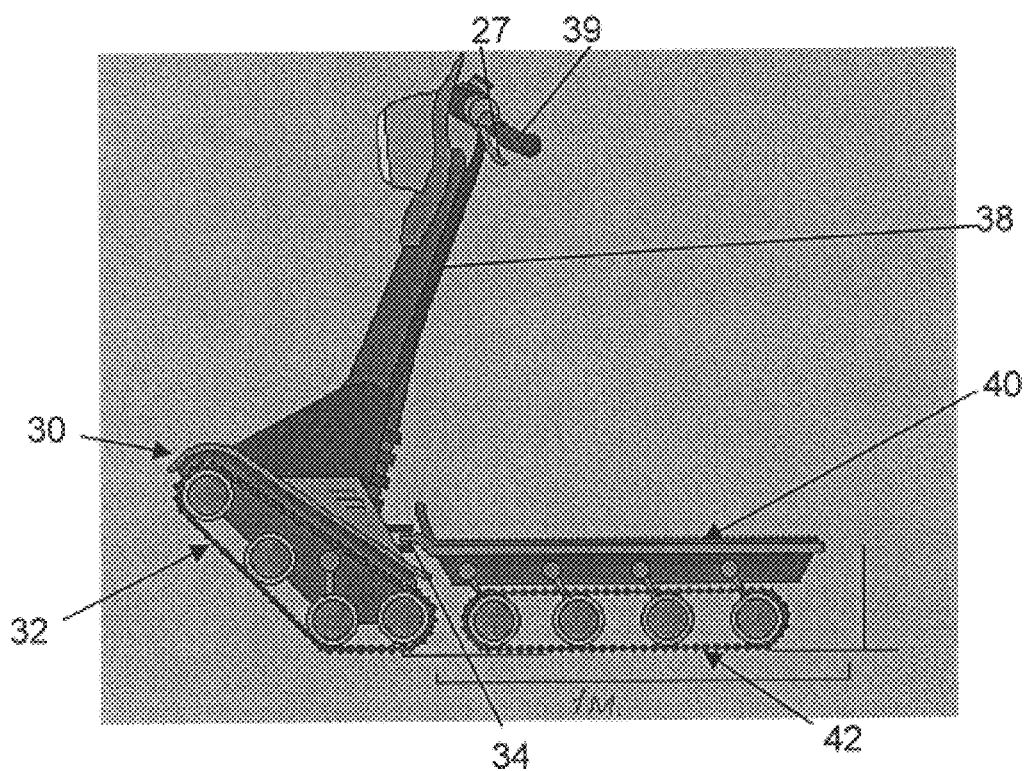
FIG. 3 is a side view of a vehicle according to another embodiment of the invention.
Figure 4:
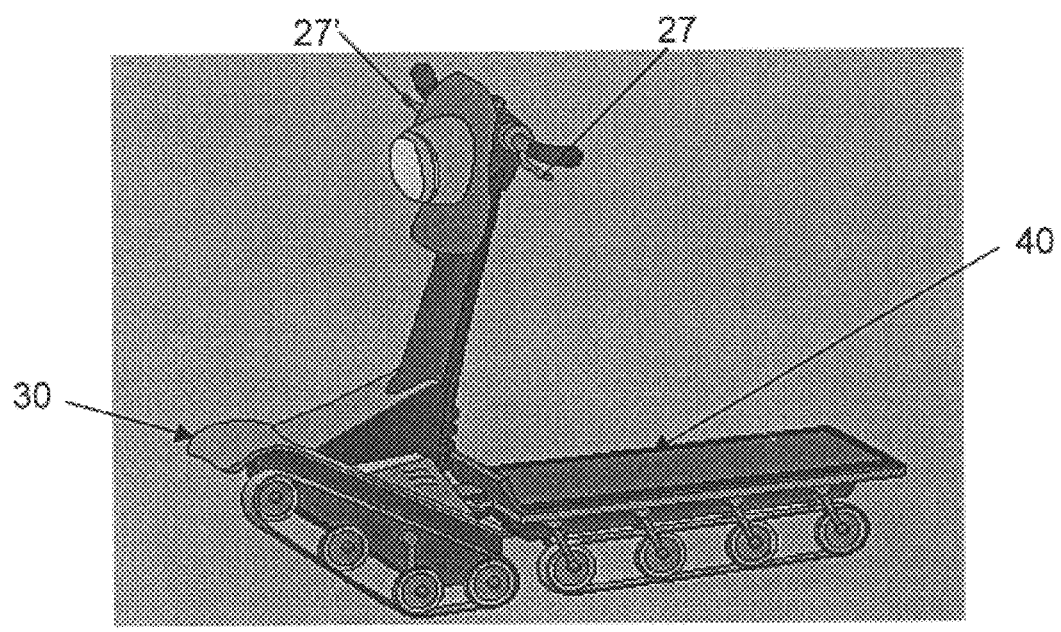
FIG. 4 is a perspective view of the vehicle of FIG. 3.
Figure 5:
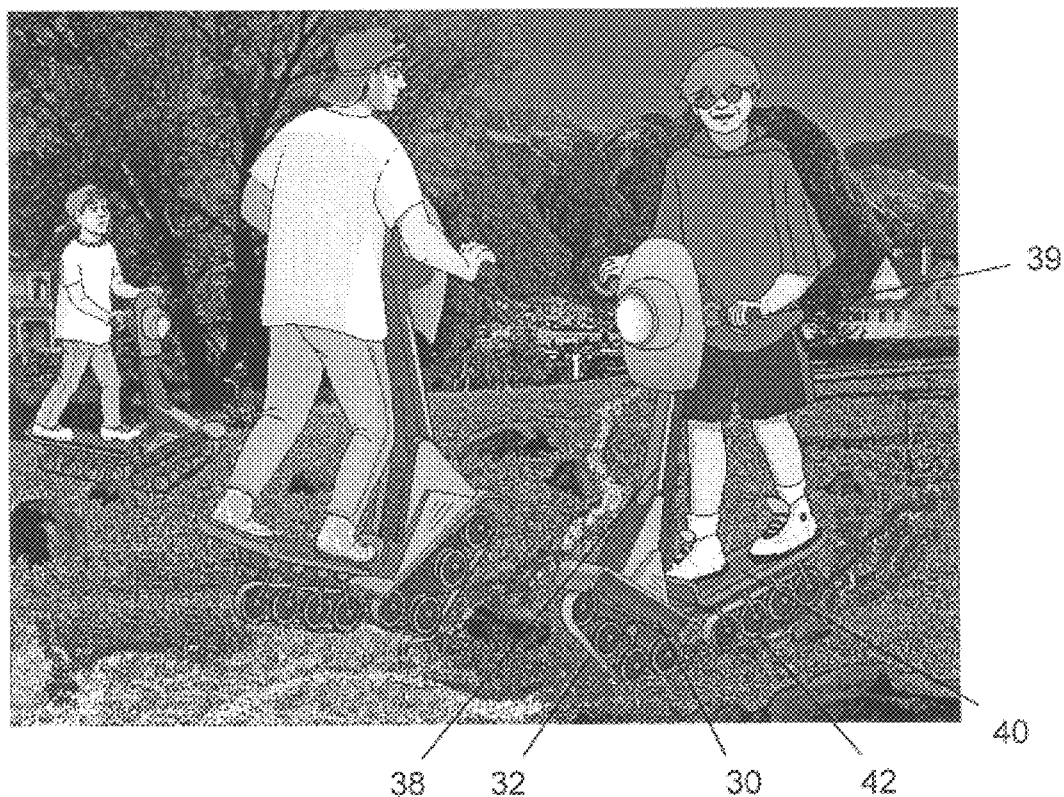
FIGS. 5, 6 and 7 schematically illustrate the use of a vehicle of FIGS. 3 and 4 to overcome terrain irregularities.
Figure 6:
Figure 7:

FIGS. 3, to 7 illustrate another, less preferred embodiment of the invention. This embodiment, though structurally somewhat different from that of FIG. 1, is based on the same concept, and therefore the illustration of its operation is useful to the understanding of the usefulness of the invention. In this embodiment, the rear track 42 consists of two parallel, horizontal segments, an upper and a lower one, and the supporting wheels are disposed and mounted so as to produce said configuration. The biasing springs for the wheels are not shown in said figures, but they are provided. The front component assembly is designated by 30, the front track by 32, the rear-component assembly by 40, and the rear track by 42. The steering column, indicated at 38 and provided with handles 39, in directly attached, in this embodiment, to the front plate, and joint 34, having a horizontal and a vertical degree of freedom, is provided between the front and the rear plate. FIGS. 5 to 7 show the operation of the device over different terrain conditions.

Figure 8:
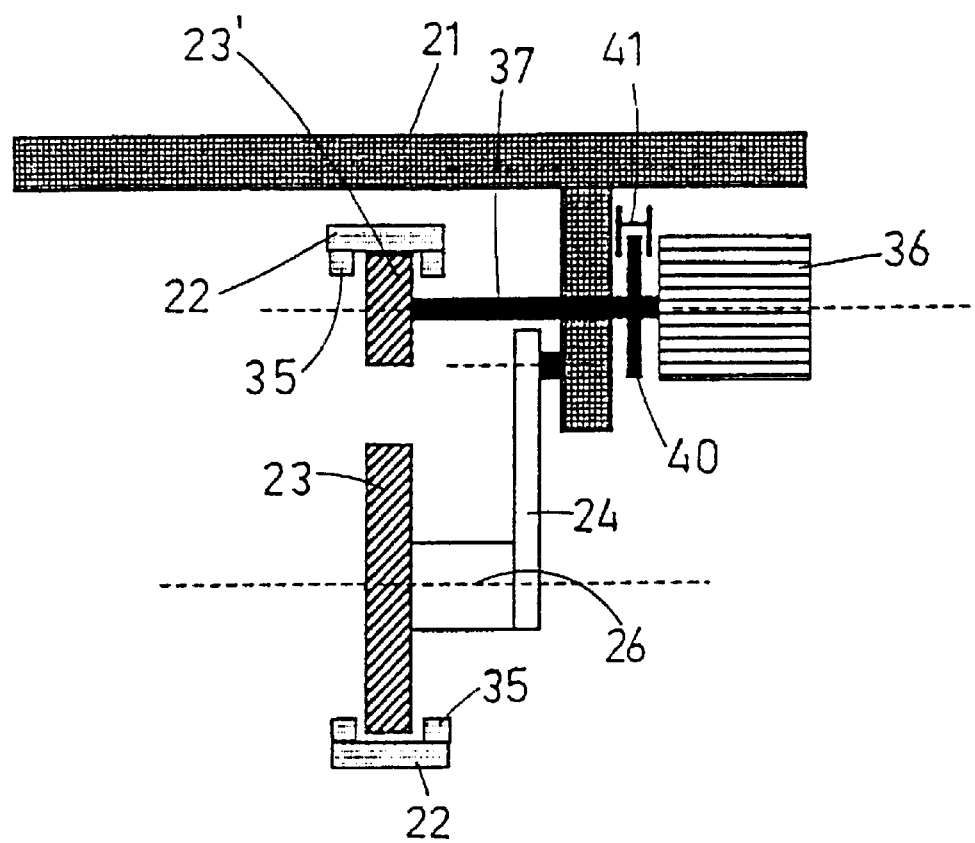
FIG. 8 is a schematic, vertical cross-section at an enlarged scale of the drive of the rear component assembly of the vehicle of FIG. 1, wherein the parts not pertaining to said drive are omitted.

FIG. 8 schematically illustrates the drive of the rear component assembly in vertical, transverse cross-section, and the numerals relative to said assembly are used in the figure. However, FIG. 8 it could also be considered as a schematic illustration of the drive of the front component assembly, the two drives being substantially identical, in which case numerals 11, 12; 13, 13', and 28 should be considered as substituted to numerals 21, 22, 23, 23', and 24 respectively.

In FIG. 8, 21 is, once again, the rear plate and 22' is the rear track, positioned under the center of the operator platform. Each pair of wheels 23 is attached to one rod 26, which supported by rod 24 (see FIG. 1) which is biased by a spring. This arrangement is called a "tandem setup". The track cannot slip from the wheels, due to its structure, which encloses side walls 35. The track is preferably made of rubber reinforced with Kevlar™ fibers.

Numeral 36 indicates a motor (hydraulic or electric), connected to drive wheel 23' through shaft 37. Disk 40 of a disk brake is keyed to shaft 37. Two pads 41, activated by cables or rods not shown, are part of the disk brakes, which are conventional devices as used in bicycles and motorcycles.

Figure 9:
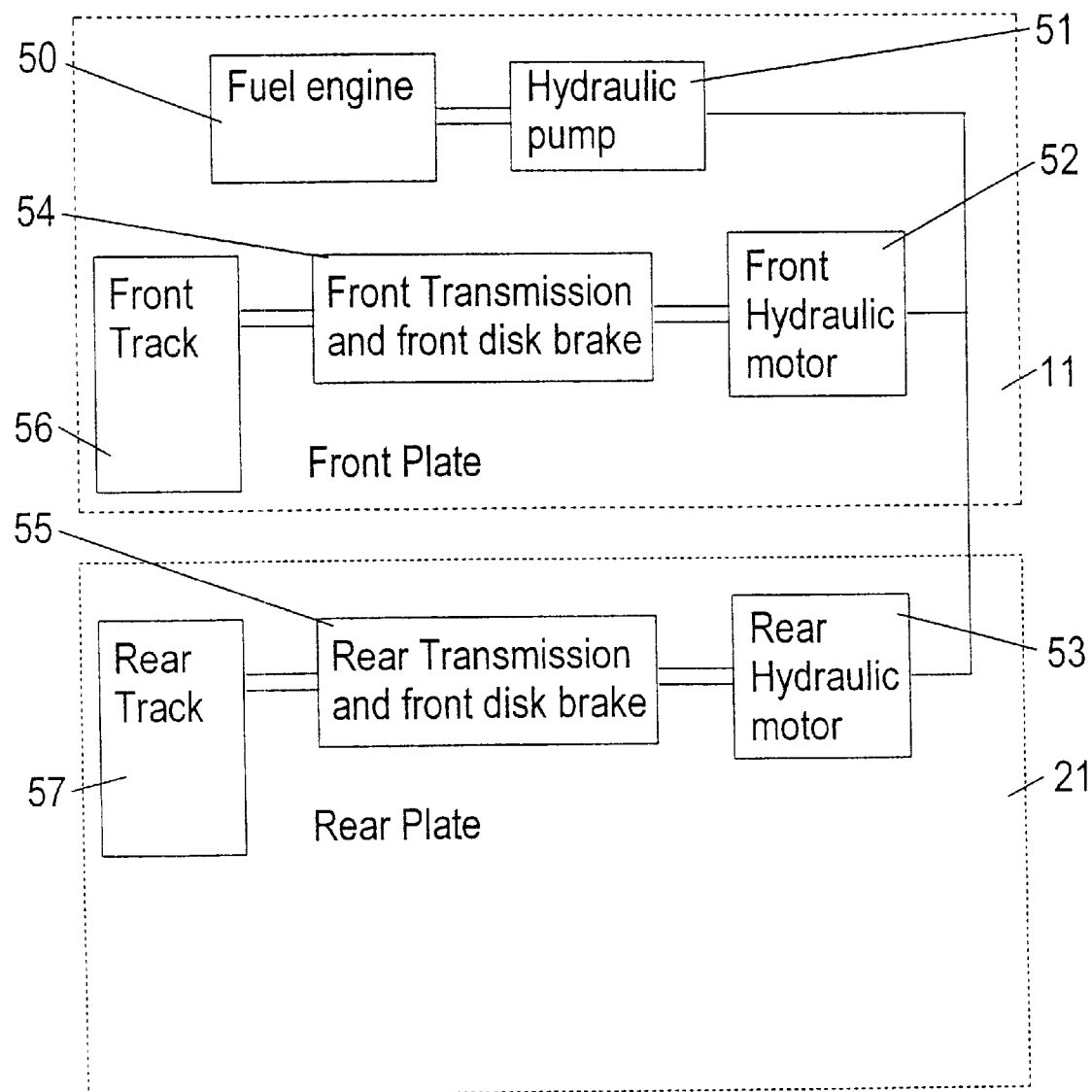
FIGS. 9 to 11 are block diagrams illustrating various embodiments of the drive system of vehicles according to the invention.
Figure 10:
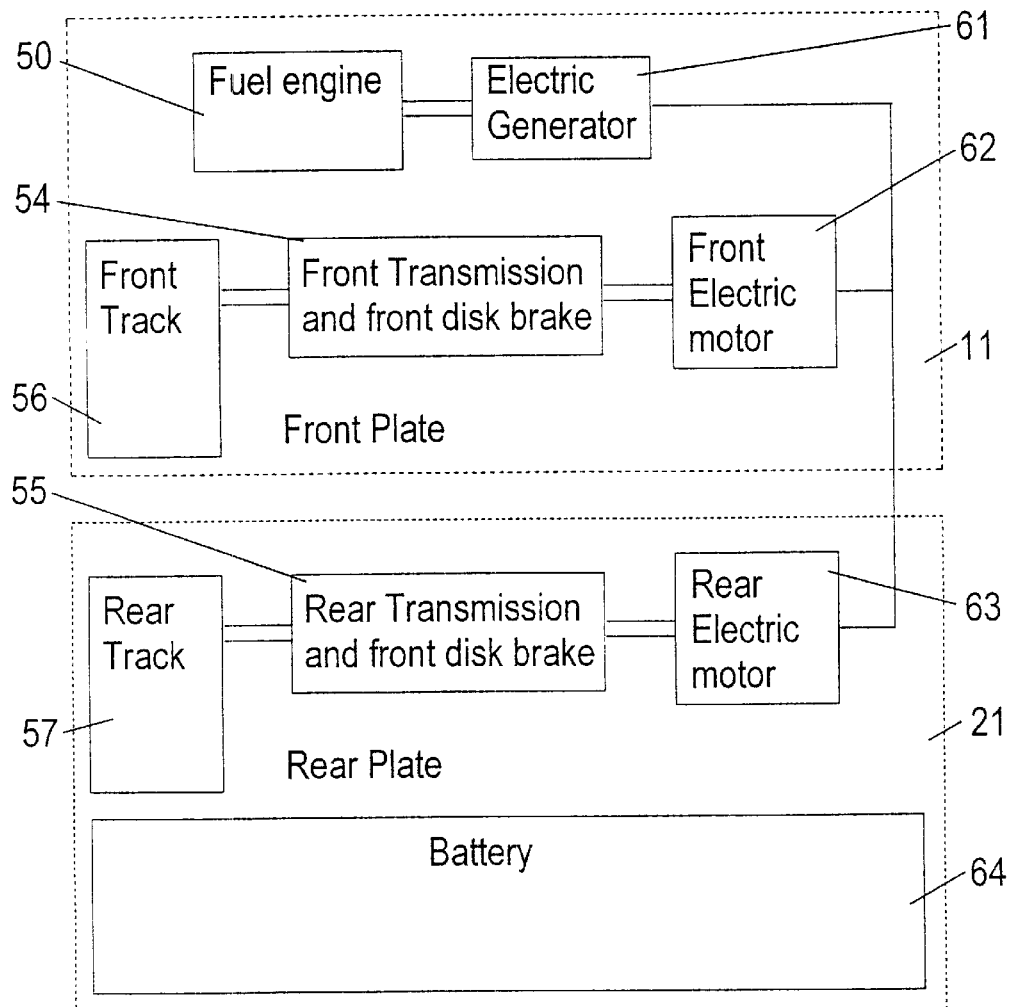
Figure 11:
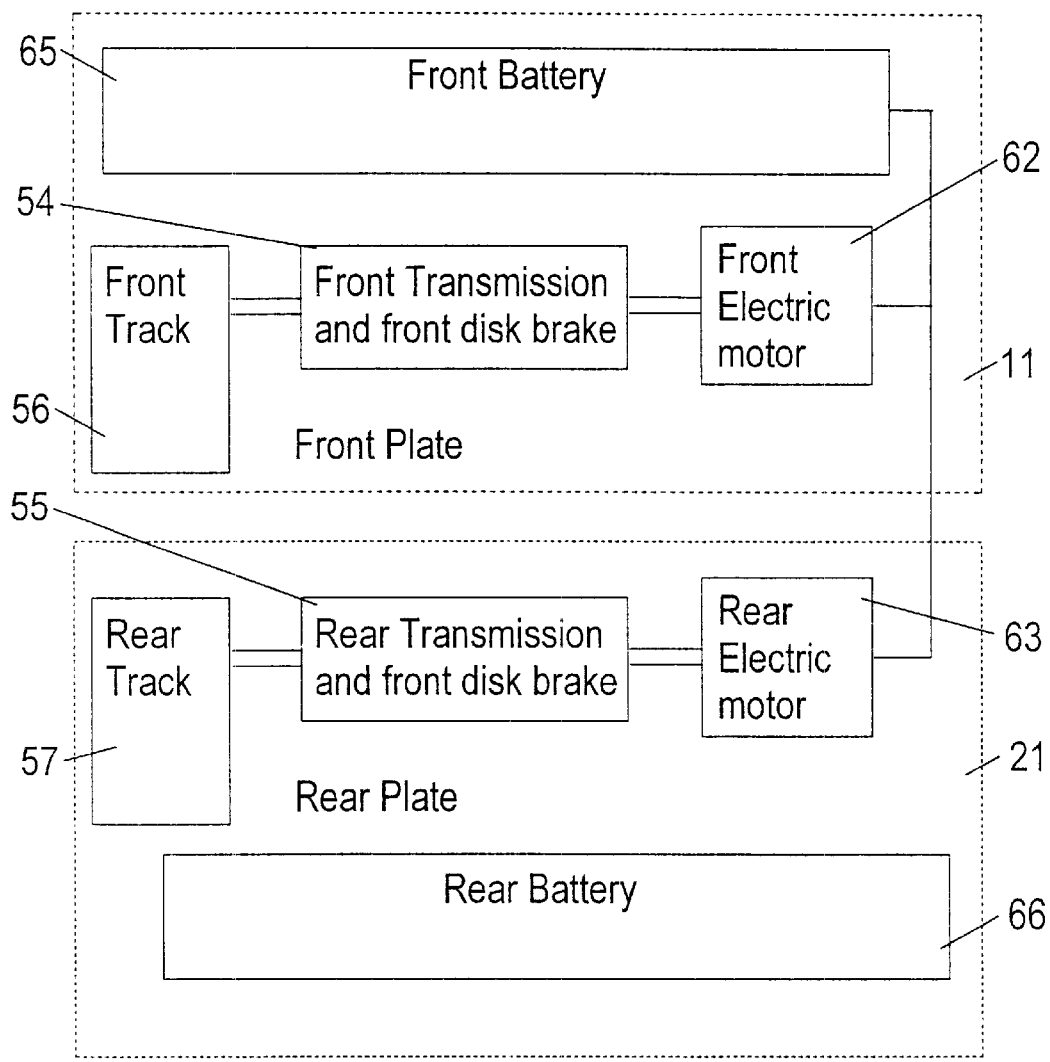

The drive and brake arrangement of FIG. 8 is repeated in the front component assembly. If the one track is broken, whether it is the front or rear one, the brakes will still operate on the remaining track, which will stop the vehicle. On each portion of the vehicle there is a motor, drive wheel and braking system. The two motors of the front and of the rear component assemblies work in parallel whereby driving force is generated by both tracks. If hydraulic motors are used, it is possible to operate them in parallel or in series and thus to control the amount of torque which the vehicle can provide. As has been said, joint means is provided between the two plates 11 and 21 of the vehicle to permit rotation about a horizontal and about a vertical axis. Joints that have two degrees of freedom are known in the art and need not be described FIGS. 9, 10 and 11 schematically disclose three examples of power unit and transmission which can be used in embodiments of the invention. In all these figures, numerals 11 and 21 schematically indicate the front and rear plate respectively. In FIG. 9, 50 represents a combustion engine, example a gasoline engine, which may have e.g. a power in the order of 20 Hp, and is coupled to a variable displacement pump 51. Pump 51 drives two small, high moment, hydraulic, secondary motors, front secondary motor 52, located on the front plate, and rear secondary motor 53, located on the rear plate. The secondary motors, through the front transmission 54 and the rear transmission 55, respectively, drive the wheels which drive the front track 56 and the rear track 57. Disk brakes are part of or coupled to the said transmissions.

In FIG. 10, the parts that are the same as in FIG. 9 are indicated by the same numerals. However, in place of an hydraulic pump, an electric generator 61 is driven by combustion engine 50 and feeds electric current to front electric motor 62 and rear electric motor 63. A battery 64, which can be charged by engine 50 or by an outside source, can be attached ot the rear plate to be used to supply electric current to the motors for quieter operation or in case of emergency or for any other reason.

In FIG. 11, the parts that are the same as in FIG. 10 are indicated by the same numerals. In this embodiment, the two electric motors 62 and 63 are fed with electric current by two batteries, front battery 65 and rear battery 66.

The optimization of the suspension system—which comprises the supporting wheels, the levers on which the wheels are mounted, the biasing springs and the dampers—by computer program and S/W tools can be carried out by skilled persons according to technology known in the art. Likewise, the optimization of the shape of the tracks, of the angle between the two segments of the front track, and all other geometric parameters is within the ability of the skilled person. Preferably, the engine and transmission are so designed that the vehicle will not exceed a moderate speed, e.g., in the order of 30 km/h.

The vehicle according to the invention can be driven even in extremely difficult areas, because the ground pressure is low, the tracking friction is high and it has a very low profile, which makes it an ideal solution for crossing obstacles and difficult barriers. If a particular obstacle cannot be crossed by the vehicle, it is light enough to be carried by the user or rider.

Figure 12:
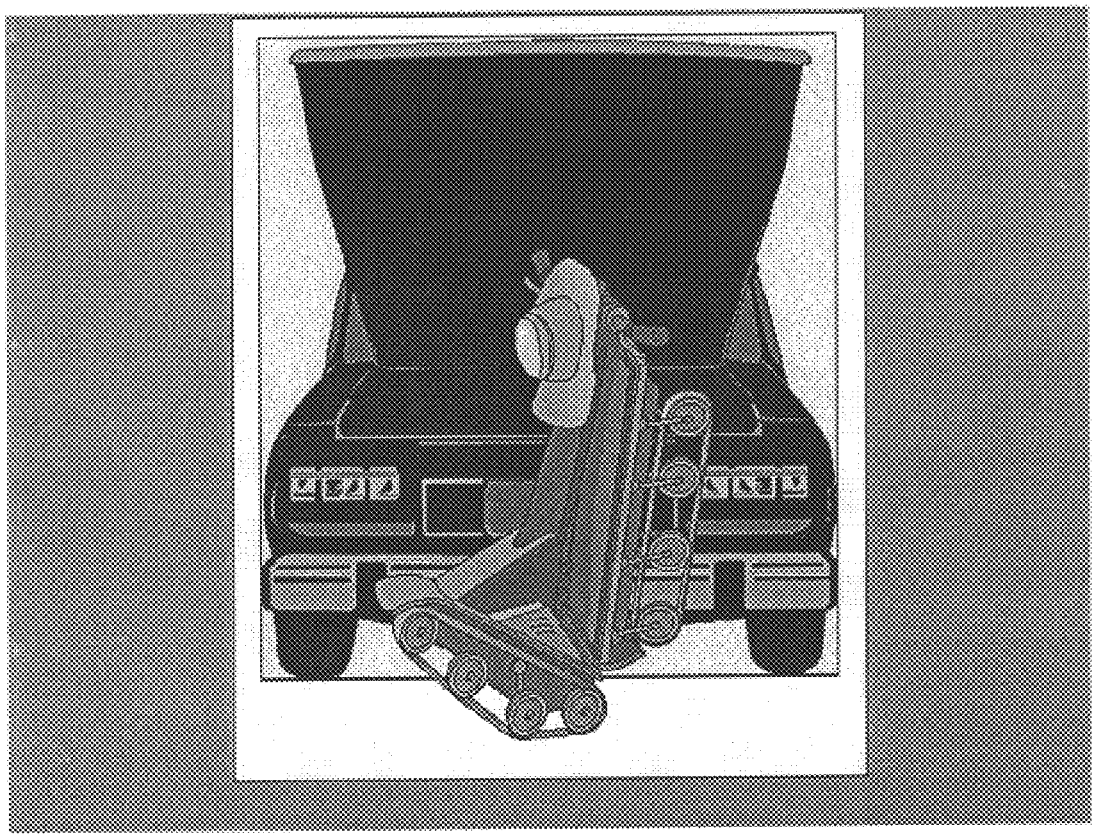
FIG. 12 is a schematic, perspective view illustrating how a vehicle, according to an embodiment of the invention, can be folded to be stored in the baggage compartment of a car, without being disassembled.

The front and rear component assemblies of the vehicle can be connected or separated from one another. If the space for carrying the vehicle is sufficient to accommodate it in a folded, bit assembled, condition, as shown in FIG. 12, they will be connected, but if said space is not sufficient, by disassembling the joint which connects them. The vehicle of FIG. 12 is shown as having the structure of FIGS. 3 to 7, but any vehicle according to the invention, in particular a vehicle a illustrated in FIGS. 1 and 2, can be carried in the same way The total weight of the vehicle is an important factor. It is desirable that the vehicle be extremely light, e.g., have a weight in the order of 25 kg, so that the driver may carry it for crossing a barrier that cannot be crossed while driving, such as a wall steps, a canal or the like. Technological solutions for achieving light weights are known, e.g., in the automotive industry, and they involve the use of light metals, composite materials, light, high-power motors, high-pressure/torque hydraulic transmission systems, and so on.

The vehicle according, to the invention may also be used for military purposes. For heavy duty applications (such as military or long distance off road, desert crossing etc.) the vehicle should be provided with one or more of the following features: a stronger combustion engine, gasoline or diesel, a larger fuel accumulator, a container for spare tracks, a cabinet for water and food storage, an operator chair which can be folded up and down lights for night drive. The total weight of such a vehicle, however, should not exceed 35 kg. Such a vehicle permits a soldier carrying a substantial amount of equipment to move at a moderate speed in all kinds of terrain. The smallness of the vehicle makes it difficult to detect it by modern sensing devices.

The vehicle may have a special configuration for operation on snow. In particular, the tracks should be adapted for snow traction and have a bigger width and special ribs.

The vehicle of the invention is designed to travel at a very moderate speed (e.g., up to 20 km/hr). Therefore, its general concept is very different from that of high speed, all train vehicles (ATVs) like cross-country motorcycles, or other small three- or four-wheel ATVs. The enjoyment for the user is provided by its ability quietly to travel anywhere, along narrow paths, between trees, rocks and other obstacles, and to climb very steep areas. The vehicle will be safe for the user due to its slow speed and perfect isolation from the ground thanks to the track suspension system. The fact that the rider, stands on his legs while operating the vehicle adds to its safety; his back is not subjected to impacts, and in case of an emergency, it is very easy to jump off the vehicle. This latter is light, and therefore will not harm the driver in case of turnover. The extra safety is an important parameter with ATVs. Recently, there have been major concerns on the amount of accidents associated with these devices: their riders injure themselves and others while using rapid vehicles on difficult terrains. Young people seeking excitement and enjoyment use the ATVs without being aware of the risks involved. The vehicle of the invention is intended to provide substantially the same pleasure with minimal risks.

There are specific features in the vehicle of the invention which make it a perfect solution for driving without significantly interfering with the environment. The light ground pressure produced by it causes it to leave no traces and not to damage plants. The load of the vehicle and the driver (e.g., approximately 120 kg is distributed on the large area of the single track. The ground pressure is very low compared to motorcycles, bicycles and other ATVs. E.g., the maximum ground pressure is less than 0.3 kg per $cm^2$, ten times lower than that of other ATVs.

The marks which the vehicle leaves on the ground are similar to the traces of bicycles (e.g., up to 3 cm the width of the track, but produced with very low ground pressure, as mentioned above. The vehicle is narrow and has a low profile, and will not affect the environment to much a greater event, than a pedestrian.

For maximum environmental protection, a specific drive may be provided, which comprises a small fuel engine (e.g., 80 cc, 5 hp) which charges a battery. The battery provides electric power for one hour of operation through an electric motor. Such a drive permits to cross sensitive environments without generating disturbing noises and combustion gases. The fuel engine can be used directly in less sensitive areas for continuous and high performance operation. It is possible to design the vehicle with only an electric drive system, charged by an external electric power source. Such a vehicle has a low cost and is adapted to intermittent operations. for short distances from a storage point.

The vehicle of the invention constitutes a sporting attraction in sandy areas. Its low ground pressure and tracks drive provide extremely good traction in such areas.

If the vehicle is to be used over snow or iced areas, it is provided with tracks having a larger width (e.g., about 10 cm) and with ribs which improve the traction and the steerability.

While embodiments of the invention have been described by way of illustration, it will be apparent that the invention may be carried out with many variations, modifications and adaptations, without departing from its spirit or exceeding the scope of the claims.

What is claimed is:

1. Vehicle for sport and off-road driving comprising a front end and a rear end, a longitudinal axis extending between said ends, a front component assembly and a rear component assembly, each of said component assemblies comprising a plate and a single flexible track, each said plate being mounted on and actuated by a respective one of the single flexible tracks, a joint system connecting the front and rear plates, said joint system having two degrees of freedom to permit the front component assembly to be displaced with respect to the rear component assembly by rotating about a horizontal axis that extends transverse to said longitudinal axis and about a vertical axis, a steering system at the front component assembly which comprises a steering column that, when manually rotated about at least one of said two axes, produces a steering motion of the entire said front component, and wherein said plate of said rear component assembly comprises an essentially horizontal surface for supporting the driver of the vehicle.

2. Vehicle according to claim 1 wherein each component assembly further comprises a motor and a transmission to actuate a respective one of the tracks.

3. Vehicle according to claim 2, wherein each motor and each transmission are mounted on a respective one of the front and rear plates.

4. Vehicle according to claim 1, further comprising joint couplings that connect said steering column to said plate of said front component.

5. Vehicle according to claim 1, wherein the steering column is connected to an upper surface of the plate of the front component.

6. Vehicle according to claim 1, further comprising front supporting wheels, rear supporting wheels, front drive wheels and rear drive wheels, and wherein the front and rear tracks mesh with and are supported by their respective supporting wheels and driven by their respective drive wheel.

7. Vehicle according to claim 1, wherein the joint system permits the front plate to be separated from the rear plate, so as to disassemble the vehicle into its front and rear component assemblies.

8. Vehicle according to claim 1, wherein the track on which the front plate is mounted has an operative portion comprised of a rear segment and a front segment, said front segment extending at an angle to said rear segment.

9. Vehicle according to claim 1, further comprising track driving wheels, and wherein each of the front and rear plates has a depending rib to which one of the driving track wheels is connected.

10. Vehicle according to claim 1, wherein the tracks are provided with ribs.

11. Vehicle according to claim 1, wherein each track has a horizontal operative section.

12. Vehicle according to claim 9, further comprising front track supporting wheels, wherein the rib of the front plate has a horizontal rear portion and a raised front portion, and wherein one of the front track supporting wheels on which the front track is mounted is located at a junction between said front and rear portions, so as to define a desired profile of an operative section of the front track.

13. Vehicle according to claim 1, further comprising a front motor and a rear motor, said motors being operatively connected to the front and rear tracks, respectively, for driving the front and rear tracks, respectively.

14. Vehicle according to claim 13, wherein the motors are electric motors, further comprising means for feeding electric current to said motors.

15. Vehicle according to claim 14, wherein the means for feeding electric current to the motors are selected from among: a) a combustion engine driving an electric generator, and b) electric batteries.

16. Vehicle according to claim 13, wherein the motors are hydraulic motors, further comprising a system operatively connected to the hydraulic motors for actuating said motors by delivering hydraulic fluid under pressure to said hydraulic motors.

17. Vehicle according to claim 16, wherein the system for actuating the hydraulic motors and for delivering hydraulic fluid under pressure to the hydraulic motors comprises a combustion engine and a hydraulic pump driven by said combustion engine.

18. Vehicle according to claim 6, wherein the rear drive wheels are attached to a rib of the rear plate by levers pivoted to said rib and provided with biasing springs which form a portion of a suspension for the vehicle.

19. Vehicle according to claim 3 wherein the motors and the transmission are designed so that the vehicle will not exceed a speed of about 30 km/h.

20. Vehicle according to claim 1, having a total weight of about 25 kg.

21. Vehicle according to claim 1, wherein an upper surface of the plate of the rear component forms a standing surface for the driver.

* * * * *